United States Patent [19]

Atwater et al.

[11] 3,920,341

[45] Nov. 18, 1975

[54] LOCKING DEVICE FOR A BEARING RING OF THE LIKE

[75] Inventors: Franklin S. Atwater, New Britain; Horace B. Van Dorn, Kensington; Sven V. Swanson, Hartford, all of Conn.

[73] Assignee: Textron Inc., Providence, R.I.

[22] Filed: June 15, 1972

[21] Appl. No.: 263,273

[52] U.S. Cl. ............................... 403/352; 308/236
[51] Int. Cl.² ........................................ F16D 15/00
[58] Field of Search .................... 287/52.09, DIG. 8; 308/236; 403/352, 351, 350

[56] References Cited
UNITED STATES PATENTS

| | | | |
|---|---|---|---|
| 2,270,466 | 1/1942 | Nash | 403/350 |
| 2,584,740 | 2/1952 | Reynolds | 287/52.09 |
| 2,650,141 | 8/1953 | Cooper | 287/52.09 X |
| 3,391,954 | 7/1968 | Callahan | 287/52.05 |
| 3,709,574 | 1/1973 | Potter | 308/236 |

*Primary Examiner*—Andrew V. Kundrat
*Attorney, Agent, or Firm*—Hopgood, Calimafde, Kalil, Blaustein & Lieberman

[57] ABSTRACT

The invention contemplates locking clip means having unit-handling assembled relation to the bearing ring or the like which it is to secure, in the ultimately fitted installed condition of the ring. An axial tongue of the clip is positioned in an arcuate relief of varying eccentricity, in the cylindrical ring surface to be mounted. The assembled and installed position of the ring is secured by angularly displacing the clip, and therefore the tongue, toward one of the circumferential limits of the relief.

10 Claims, 10 Drawing Figures

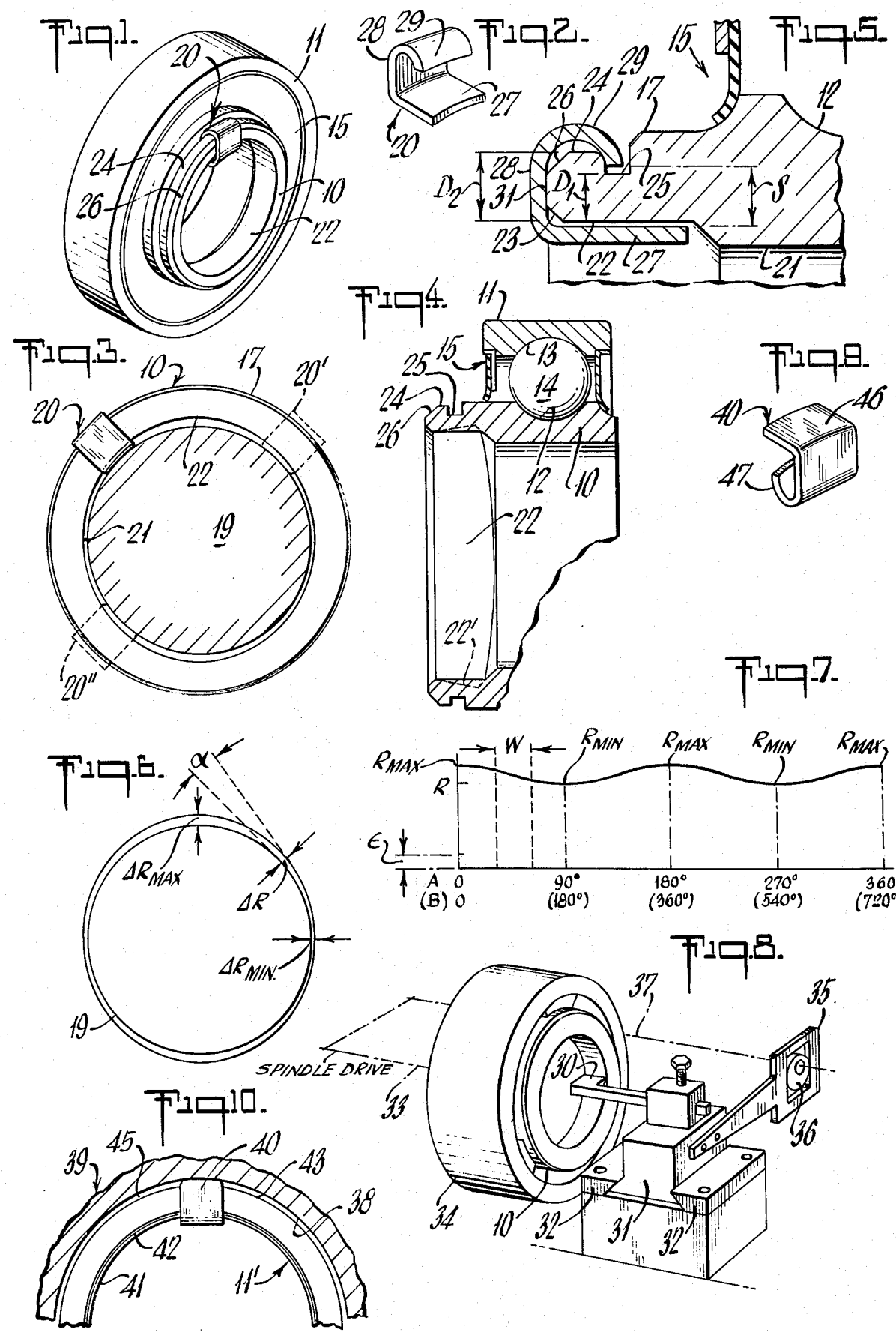

LOCKING DEVICE FOR A BEARING RING OF THE LIKE

The invention relates to locking means for securely mounting a bearing ring or the like, as of the general type disclosed in copending application Ser. No. 179,008, filed Sept. 9, 1971 and now U.S. Pat. No. 3,709,574.

In locking means of the character indicated, a locking tongue is wedged between an eccentrically relieved surface and the adjacent cylindrical surface of the shaft or bore to which the bearing ring or the like is to be secured. It is found, however, that for example, in the case of an eccentrically relieved bore, a limited range of dimensional variations is tolerable in the shaft size, for a given tongue thickness, if locking action is to survive certain types of vibration, drive reversal, and other mechanical transients.

It is, accordingly, an object of the invention to provide improved locking means of the character indicated.

Another object is to provide such locking means having inherently greater tolerance for dimensional variations.

A specific object is to provide such a locking device in which a desired effectively wedging angle, between relieved and mounting surfaces, can be available over more expanded range of tongue thickness, or size of the shaft or mounting bore, as the case may be.

A general object is to meet the above objects with a construction which lends itself to relatively simple and economic mass manufacture, and which is easy to install and effective under adverse operating conditions.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

FIG. 1 is a perspective view of an antifriction bearing, assembled in unit-handling relation with locking means of the invention;

FIG. 2 is an enlarged perspective view of the locking component of FIG. 1;

FIG. 3 is an end elevation of the locking-ring part of FIG. 1, shown in locked condition on a shaft, the shaft being shown in section, for a better view of the parts relationship;

FIG. 4 is a fragmentary longitudinal sectional view of the bearing of FIG. 1, prior to assembly of the component of FIG. 2;

FIG. 5 is an enlarged fragmentary longitudinal sectional view of the locking components in preassembled, unlocked relation;

FIG. 6 is a geometric diagram to enable identification of dimensions and dimensional relations;

FIG. 7 is a rectangular-coordinate graph to illustrate circumferential variation of the relationships depicted in FIG. 6;

FIG. 8 is a simplified view in perspective to illustrate apparatus for making the varying relationships depicted in FIGS. 6 and 7; and FIGS. 9 and 10 correspond respectively to FIGS. 2 and 3, to illustrate a modification.

Referring to FIGS. 1 to 5, the invention is shown in application to an antifriction bearing comprising inner and outer rings having opposed raceways 12–13, with plural antifriction elements 14 riding the raceways and holding the rings 10–11 in relatively rotatable and coaxial relation. Shield and/or seal means 15 may close the respective ends of the bearing. The axial end of ring 10 projects outwardly beyond the seal region and beyond the raceway region, for locking purposes to be explained, in connection with mounting to a shaft 19.

Locking-clip means 20 of the invention is carried in unit-handling relation with the projecting end of the inner ring 10. For this purpose, the cylindrical bore 21 of ring 10 is relieved at 22 over an arcuately extensive surface of varying radius and eccentricity with respect to the bearing axis, and the axial extent of the relief 22 preferably terminates at the general plane of shield and seal mounting, thus leaving the substantial body of ring 10 unaffected by the relief, so that race distortion attributable to locking action is minimized. The character of the relief contour will be later described, in connection with FIGS. 6 and 7.

To retain the clip means 20, the outer surface of the projecting end of ring 10 includes a circumferentially extending radial flange formation 24, which in the form shown is defined by a circumferentially continuous radial groove 25 between the shield-seal region 15 and the axial end, and therefore between the race 12 and the axial end of ring 10. A chamfer 26 is formed at the outer edge, to substantially match the radial spread between flange 24 and the bottom of groove 25, to provide an outward cam action on clip 20, during snap-on assembly to the ring, at groove 25.

As best seen in FIG. 2, the clip means 20 is generally C-shape; it is formed of stiffly compliant material such as spring-ribbon steel, suitably hardened after shaping. The lower end of the C-shape is tongue 27, preferably arcuate to conform to shaft 19. The thickness of tongue 27 is such as to be received with a clearance at a location of maximum radial relief ( $\Delta R_{max}$ in FIG. 6) and to interfere with shaft 19 and the relieved surface 22 at a location between the locations of maximum and minimum radial relief ($\Delta R_{max}$, and $\Delta R_{min}$, respectively). The axial extent of tongue 27 preferably overlaps the location of groove 25, as shown.

The other end of the C-shape of clip means 20 is hooked, at 29, for engagement over flange 24, being retained in groove 25, and a substantially flat integral central section 28 connects the two ends 27–29; for stability, the radially inwardly directed edge of end 29 is arcuate, as shown, to pilot on the bottom of groove 25. Preferably, the axial span between the hooked end 29 and the flat central section 28 is such, in relation to the span between the end face 31 (of ring 10) and the adjacent wall of groove 25, that the clip means 20 is naturally oriented and stabilized in the manner shown in FIG. 5. Preferably also, the unstressed radial span S between tongue 27 and the hooked end 29 slightly exceeds the radial distance $D_1$ between groove 25 and the maximum radial depth of relief 22, and span S is less than the radial distance $D_2$ between flange 24 and the maximum radial depth of relief 22, thus assuring self-retention in unstressed condition of the clip means, to provide ready actuation in the circumferential direction needed to achieve lock action.

Referring now to FIGS. 6 and 7, the eccentric relief 22 is seen to vary between maximum and minimum increments ($\Delta R_{max}$ and $\Delta R_{min}$) beyond the shaft radius R, these limits occurring at 90° spaced locations about the bearing axis. The relieved surface 22 thus defines with the adjacent shaft surface a zone which converges from each $\Delta R_{max}$ location to its adjacent $\Delta R_{min}$ location, and at substantially the mid-point between $\Delta R_{max}$ and $\Delta R_{min}$, for example at the zone W (FIG. 7), the convergence angle $\alpha$ remains within a limited range which will assure non-slip interference with tongue 27; the angle $\alpha$ is defined, for any particular location about the shaft axis, as the angle between tangents to the shaft and to the relieved surface 22 at such location. At the angular location for which the relief $\Delta R$ substantially equals the thickness of tongue 27, the angle $\alpha$ is at least no greater than the maximum slope angle at which static friction of the materials of the components 10–19–27 will hold these components against sliding displacement; for the all-steel embodiment disclosed, the angle $\alpha$ should be less than 6 degrees, being preferably in the range of 2° to 4° and at least no greater than substantially 5°.

The actual make-up of component curves and radii in surface 22 is not important, as long as the angle $\alpha$ is provided over a sufficiently extensive range W, of preferably 20°, to assure a tolerance for shaft-size variations. One relatively simple characterization of the relief 22 is that its radius may be substantially a simple-harmonic function of angle, being shown (FIG. 7) in the form of a second harmonic against the angles of a first scale A and as a fundamental against the angles of a second scale B; thus scale A will be understood to depict the FIG. 6 situation, and scale B depicts a situation in which there is only one maximum ($\Delta R_{max}$) and one minimum ($\Delta R_{min}$), spaced 180° apart.

FIG. 8 shows a simple machine-tool set-up to achieve either one of the indicated relief contours (scale A or scale B). A boring tool 30 is fixed to a slide 31, movable in guides transverse to a work-rotating axis 33. The work (ring 10) is clamped in a chuch 34 which is driven (by means not shown) on the axis 33. A Scotch-yoke arm 35 fixed to slide 31 is oscillated by an eccentric 36 on an auxiliary shaft having synchronized connection to the drive 33; for the scale A situation, the shaft 37 rotates at twice the speed of shaft 33, and for the scale B situation, these shafts rotate 1:1. The throw of eccentric 36 is selected to be the desired difference between $\Delta R_{max}$ and $\Delta R_{min}$, and $\Delta R_{min}$ preferably exceeds zero, so that the relief 22 is circumferentially continuous and no part of the locking region need be involved in finish-grinding the bore 21 of ring 10.

FIGS. 9 and 10 illustrate that principles of the invention are also applicable to the locked retention of a ring, such as the outer bearing ring 11', in a mounting bore 38; the bore 38 may be in a hub forming part of a pulley, gear or the like 39 which rides on the bearing. It will be understood that outer ring 11' is formed as described for inner ring 10, except that inwardly and outwardly directed parts and functions are reversed. Thus, the locking clip 40 is carried in unit-handling preassembled relation with an axially projecting end of the ring 11'. The flange 41, and the groove (not shown) by which it is defined, both extend radially inwardly, there being an inner end chamfer 42 of radial extent substantially matching the depth of the groove. The relief 43 is from the outer surface of ring 11', being either of the nature of scale A or scale B of FIG. 7, i.e., two or one cycle of varying-eccentric undulation over the circumferential extent of ring 11'. lock-accommodating convergent zones are thus defined in a void 45, lock action being achieved upon wedging the clip tongue 46 angularly in the direction of minimum offset of surface 43 from the bore 38. The flange or groove-engaging part 47 of the clip is a radially outwardly directed hook end of the clip 40.

The described construction in all its forms is seen to meet all stated objects. It represents almost an irreducible minimum in cost, and it is highly effective. To set the lock against reaction forces encountered in reversible drives, two clips are desired, as indicated by phantom outline 20', in FIG. 3 (adjacent clip 20), or as indicated by phantom outline 20'' in FIG. 3; in either case, low jam angles $\alpha$ characterize both locking engagements (clips 20–20', or clips 20–20''). In an actual construction of the FIG. 3 arrangement for a 1-inch diameter bore 21, a tongue 27 of 0.032-inch thickness locked at 44° from the location of $\Delta R_{max}$; an angle $\alpha$ of 3.43 degrees occurred at such engagement, for $\Delta R_{max}$=0.043 inch and $\Delta R_{min}$=0.013 inch.

While the invention has been described in detail for the preferred forms shown, it will be understood that modifications may be made without departure from the invention. For example, by introducing more complex programming in the undulating function picked off at arm 35, as by using a specially characterized cam and follower mechanism in place of the Scotch-yoke, a desired range of low angle $\alpha$ can be provided for even greater spans than here indicated at W, as will be understood. Also, the use of lathe techniques in FIG. 8 is merely illustrative, in that milling and/or grinding techniques may serve equally well or better, for particular purposes. Still further, by generating an undercut 22' in the form of a conical taper in the relief of varying eccentricity, it is possible to enhance the effectiveness of clip retention, prior to ring assembly and locking to its shaft, as will be understood; as shown in FIG. 4, the direction of convergence of such a tapered undercut 22' is outward of the relieved end of the ring component.

What is claimed is:

1. In combination, a machine element including a ring component sized to fit a given cylindrical mounting profile, said ring component having an annular axially extending end portion projecting in axially offset relation to a body portion, said ring component being defined between inner and outer cylindrical surfaces, one of said surfaces being sized for fit to the given mounting profile, said one surface at said end being circumferentially continuously relieved for its full 360° circumferential extent, such relief being characterized over its arcuate extent by a continuous eccentricity which is arcuate in the same direction about a common center and which eccentricity continuously varies about said common center to the extent of an integer plurality of cycles of such variation for a full 360° about the ring axis, thereby defining a corresponding plurality of interlaced maximum and minimum reliefs at angularly spaced locations about the axis of said one surface, a locking component including a tongue of thickness intermediate the maximum and minimum reliefs, and engaged means coacting between said components for retaining an assembled relation of said tongue in one of the relieved regions of said ring component.

2. The combination of claim 1, in which said locking component is a clip extending over said end at a limited angular location thereof.

3. The combination of claim 1, in which the variation of eccentric relief is substantially a simple-harmonic function throughout a range extending both sides of said angular location.

4. The combination of claim 1, in which said relief of varying eccentricity is characterized by a tapered undercut in which the convergence of the taper is in the direction outward of the relieved end of said ring component.

5. The combination of claim 1, in which for the angular location at which the relief substantially equals the thickness of said tongue, the angle between the tangent to the relief contour and the tangent to said one surface is at least no greater than the maximum slope angle at which the static friction of the materials of said components will hold said components against sliding displacement.

6. The combination of claim 5, in which said components are of steel and said maximum angle is less than 6°.

7. The combination of claim 6, in which said angle is at least no greater than substantially 5°.

8. The combination of claim 6, in which said angle is in the range of 2° to 4°.

9. In combination, a machine element including a ring component having a cylindrical bore sized to fit a given cylindrical mounting shaft, said ring component having an annular axially extending end portion projecting in axially offset relation to a body portion, said bore at said end being circumferentially continuously relieved for a full 360° circumferential extent, such relief being characterized over its arcuate extent by a continuous eccentricity which is arcuate in the same direction about a common center and which eccentricity continuously varies about said common center to the extent of an integer plurality of cycles of such variation for a full 360° about the ring axis, thereby defining a corresponding plurality of interlaced maximum and minimum reliefs at angularly spaced locations about the axis of said one surface, a locking component including a tongue of thickness intermediate the maximum and minimum reliefs, and engaged means coacting between said components for retaining an assembled relation of said tongue in one of the relieved regions of said ring component.

10. In combination, a machine element including a ring component having an outer cylindrical surface sized to fit a given cylindrical mounting bore, said ring component having an annular axially extending end portion projecting in axially offset relation to a body portion, said outer cylindrical surface at said end being circumferentially continuously relieved for its full 360° circumferential extent, such relief being characterized over its arcuate extent by a continuous eccentricity which is arcuate in the same direction about a common center and which eccentricity continuously varies about said common center to the extent of an integer plurality of cycles of such variation for a full 360° about the ring axis, thereby defining a corresponding plurality of interlaced maximum and minimum reliefs at angularly spaced locations about the axis of said one surface, a locking component including a tongue of thickness intermediate the maximum and minimum reliefs, and engaged means coacting between said components for retaining an assembled relation of said tongue in one of the relieved regions of said ring component.

* * * * *